United States Patent
Tarkuç et al.

(10) Patent No.: US 12,553,631 B2
(45) Date of Patent: Feb. 17, 2026

(54) AIR PURIFIER DETECTING ERRORS

(71) Applicant: ARCELIK ANONIM SIRKETI, Istanbul (TR)

(72) Inventors: Simge Tarkuç, Istanbul (TR); Nihat Kandemir, Istanbul (TR); Burak Çoban, Istanbul (TR); Dilan Er, Istanbul (TR); Ege Keskin, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 350 days.

(21) Appl. No.: 17/928,698

(22) PCT Filed: Jul. 8, 2021

(86) PCT No.: PCT/TR2021/050704
§ 371 (c)(1),
(2) Date: Nov. 30, 2022

(87) PCT Pub. No.: WO2022/098326
PCT Pub. Date: May 12, 2022

(65) Prior Publication Data
US 2023/0266027 A1   Aug. 24, 2023

(30) Foreign Application Priority Data
Nov. 3, 2020   (TR) .................. 2020/17522

(51) Int. Cl.
*B01D 53/02*   (2006.01)
*B01D 53/34*   (2006.01)
(Continued)

(52) U.S. Cl.
CPC ............ *F24F 11/38* (2018.01); *B01D 53/025* (2013.01); *B01D 53/34* (2013.01); *B01D 53/346* (2013.01);
(Continued)

(58) Field of Classification Search
CPC ....... B01D 53/02; B01D 53/025; B01D 53/34
See application file for complete search history.

(56) References Cited

FOREIGN PATENT DOCUMENTS

| CN | 108758856 A | 11/2018 |
|---|---|---|
| CN | 208626860 U | 3/2019 |

(Continued)

OTHER PUBLICATIONS

PCT/TR2021/050704, "International Search Report and Written Opinion", Dec. 2, 2021, 7 pages.

*Primary Examiner* — Robert A Hopkins
(74) *Attorney, Agent, or Firm* — Kilpatrick Townsend & Stockton LLP

(57) ABSTRACT

The present invention relates to an air purifier comprising a body having an air inlet through which the air in the environment is sucked and a clean air outlet through which the cleaned air is released to the environment, a first $CO_2$ sensor which is disposed at the air inlet and a second $CO_2$ sensor which is disposed at the clean air outlet, a $CO_2$ adsorption unit which chemically adsorbs the carbon dioxide in the air by supplying a basic solution, a pump which delivers the ambient air to the $CO_2$ adsorption unit through the air inlet, a base tank which supplies the basic solution to the $CO_2$ adsorption unit, an acid tank wherein the air of which the carbon dioxide is adsorbed is treated with an acidic solution, and an electrodialysis unit which separates the salt components formed after the ambient air is treated with the basic solution and the acidic solution into acid and base.

16 Claims, 5 Drawing Sheets

Figure 1:
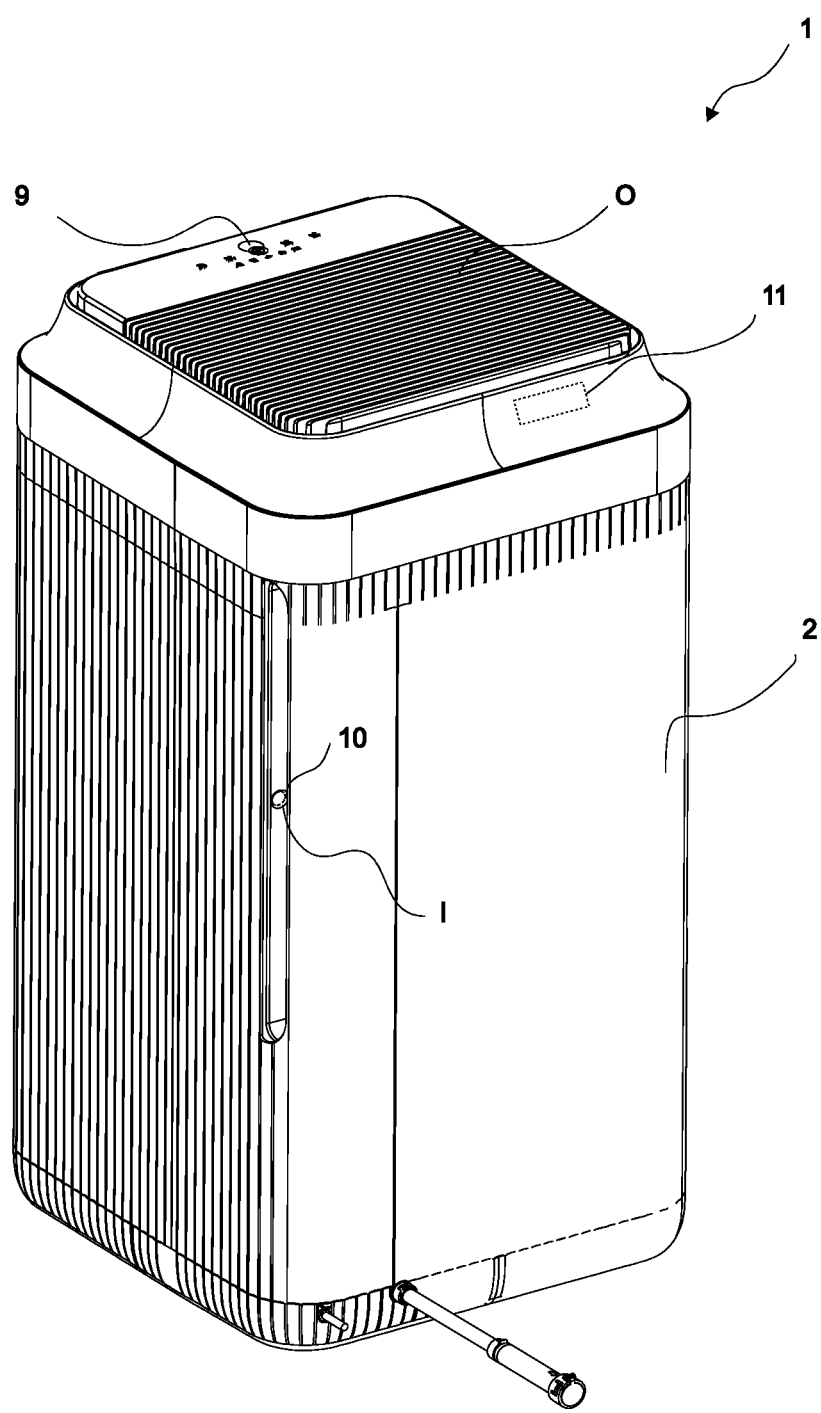

(51) Int. Cl.
  $B01D\ 53/62$  (2006.01)
  $B01D\ 53/78$  (2006.01)
  $B01D\ 53/96$  (2006.01)
  $B01D\ 61/46$  (2006.01)
  $F24F\ 8/15$  (2021.01)
  $F24F\ 11/38$  (2018.01)
  *$F24F\ 110/70$*  (2018.01)
  *$F24F\ 140/00$*  (2018.01)

(52) U.S. Cl.
  CPC ............. $B01D\ 53/62$ (2013.01); $B01D\ 53/78$ (2013.01); $B01D\ 53/965$ (2013.01); $B01D\ 61/46$ (2013.01); $F24F\ 8/15$ (2021.01); $B01D\ 2257/504$ (2013.01); $B01D\ 2259/4508$ (2013.01); $F24F\ 2110/70$ (2018.01); $F24F\ 2140/00$ (2018.01)

(56) References Cited

FOREIGN PATENT DOCUMENTS

| | | | | |
|---|---|---|---|---|
| CN | 111121185 A | 5/2020 | | |
| GB | 2530089 A | 3/2016 | | |
| WO | WO-2018002710 A2 * | 1/2018 | ............. | F24F 11/30 |
| WO | 2018206682 A1 | 11/2018 | | |

* cited by examiner

AIR PURIFIER DETECTING ERRORS

RELATED APPLICATIONS

This application is a U.S. National Phase of International Application No. PCT/TR2021/050704, filed Jul. 8, 2021, claiming priority to Turkish Patent Application No. 2020/17522, filed Nov. 3, 2020, contents of which are hereby incorporated by reference in their entirety.

The present invention relates to an air purifier which cleans the air by adsorbing carbon dioxide and which, when an error occurs at the operation steps, can detect the source of the error.

Today, the need for ventilation and the need for fresh air becomes more important in environments such as homes and offices especially in high-rise buildings. Plants can be a temporary solution for daytime but when the sunlight disappears, plants also start to produce carbon dioxide like human beings and the air quality of the environment decreases. Especially in high-rise buildings, it is not always possible to continuously keep the windows open and ventilate the environment. The continuously rising carbon dioxide amount in the air adversely affects human health. The amount of oxygen in a closed environment directly affects the metabolic rate of people and the lack thereof creates weakness and fatigue in humans. Ensuring that the amount of oxygen in the closed environment does not fall below a certain level while reducing the amount of carbon dioxide generated in the environment makes the human metabolism much more vivid and vigorous.

Moreover, the increase in the amount of carbon dioxide generated by people not only during the day but also during sleep directly affects sleep quality and harms health.

In most of the state of the art air purifiers, dust and bad odors in the air are trapped by HEPA, UV, carbon filter and other filters such that the cleaned air is released back into the room.

In the air purifiers, it is possible that the device may not function properly due to many problems such as clogging in the filter or air inlet and air outlet openings. It is very difficult for the user to perceive by himself/herself that the air cannot be cleaned due to possible problems in the device. In order for the user to understand whether the air is cleaned when the device is not working, he/she needs to use an extra device or apparatus which measures the air quality.

Furthermore, even if the user determines that the air purifier does not work and does not clean the ambient air sufficiently, he/she cannot determine exactly in which part of the device the error is.

In the state of the art Chinese Utility Model Document No. CN208626860, an air purifier is disclosed, which can detect errors, wherein gas detectors are disposed at the filter outlets.

The aim of the present invention is the realization of an air purifier which detects the error when the ambient air is not cleaned.

Another aim of the present invention is the realization of an air purifier wherein the part of the device in which the error occurs is detected and the user is warned accordingly.

The air purifier of the present invention comprises a body having an air inlet through which the ambient air is sucked, and a clean air outlet through which the cleaned air is released back into the environment. Moreover, there is a carbon dioxide outlet tube through which the carbon dioxide adsorbed in the body is released to outside the environment. An acid tank and a base tank are provided on the body. The body further comprises a $CO_2$ adsorption unit. The air taken through the air inlet is delivered to the $CO_2$ adsorption unit by means of a pump, and is mixed with the basic liquid solution received from the base tank in the $CO_2$ adsorption unit. Thus, the carbon dioxide in the air is adsorbed by the basic solution so as to create carbonate compound. The air of which the carbon dioxide is adsorbed is sent to the acid tank, and here the carbon dioxide adsorbed from the air is released again, and basic chemicals and acid solution salt are formed. Moreover, the released carbon dioxide is discharged out of the room by means of a dirt air discharge tube. The salt formed in the acid tank is sent to an electrodialysis unit to be separated into acidic and basic solutions again, and thus, the acidic and basic solutions required in the air purifier are constantly supplied to the device.

The air purifier of the present invention further comprises a control unit.

The air purifier of the present invention comprises a first $CO_2$ sensor which is disposed at the air inlet and a second $CO_2$ sensor which is disposed at the clean air outlet. If the amounts of carbon dioxide measured by both $CO_2$ sensors are equal to each other, the control unit runs an error detection algorithm.

In an embodiment of the present invention, the air purifier comprises at least one sensor which measures the pH values of the basic solution in the $CO_2$ adsorption unit. In an embodiment of the present invention, the air purifier comprises an air bubble generator tube which delivers the basic solution to the $CO_2$ adsorption unit or a basic solution generator in the $CO_2$ adsorption unit or a diffuser which provides the mixing of the air and the basic solution so as to form bubbles in case the basic solution is loaded by the user in advance. Said air bubble generator tube or said diffuser provides the mixing of the basic solution and the air so as to form bubbles in the $CO_2$ adsorption unit. Therefore, the $CO_2$ adsorption unit comprises a sensor which measures turbidity and/or a sensor which measures conductivity and/or a sensor which measures vibrations. Thus, if there is no problem with the pH value of the basic solution in the $CO_2$ adsorption unit, it is controlled whether the air and the basic solution are properly mixed. In case the turbidity, vibrations and conductivity values of the basic solution are different from optimum values predetermined by the manufacturer, the control unit determines that there is an error in the air bubble generator tube or the diffuser in the $CO_2$ adsorption unit.

In the air purifier of the present invention, the pH value of the basic solution must be between 8 to 14 in order to ensure proper operation. The refractive index predetermined by the manufacturer is between 1.3 and 1.5. The vibration value predetermined by the manufacturer is <0.01 g. At a vibration over said value, it is determined that there is turbulence.

The basic solution conductivity value predetermined by the manufacturer is 145±10 mS/cm (@21° C.).

In an embodiment of the present invention, the air purifier comprises a flowmeter connected to the pump. Said flowmeter measures the amount of the ambient air taken into the $CO_2$ adsorption unit. The control unit compares the data received from the flowmeter with the amount of air predetermined by the manufacturer required for the operation of the device, and decides whether the pump is working or not.

Under the normal operational conditions, the air pumped by the air pump to the $CO_2$ adsorption unit is 150 l/min. The air pump can supply air at full capacity (100%=150 l/min) or at a min capacity of 25%.

In an embodiment of the present invention, the air purifier comprises liquid level sensors which are disposed at the acid tank and the base tank. The control unit compares the liquid levels received from said sensors with the minimum acid and base tank fullness levels required for the efficient operation of the device, and detects whether the solutions in the acid tank and the base tank fall below the critical level or not.

Under the normal operational conditions, equal amount of liquids are present in the acid and base tanks. The acid volume (Va) is equal to the base volume (Vb), that is (Va=Vb), which is 250 ml. Under the normal operational conditions, the liquid height in the acid tank when the tank is full is 12 cm while the liquid height which is required in the base tank is 12 cm.

In an embodiment of the present invention, the air purifier comprises an ampermeter which is connected to the electrodialysis unit. The data received from said ampermeter is compared with the current value predetermined by the manufacturer, which must be measured at the electrodialysis unit under the normal operational conditions, and it is decided whether there is a problem in the electrodialysis unit or not. Under the normal operational conditions, the voltage value in the electrodialysis unit is 30V and the current value is 0.6 A-2.4 A.

If the air purifier continues to operate in case the device does not perform the carbon dioxide removal process, the components may age, the electrodialysis unit, which enables the salt formed in the device after the carbon dioxide adsorption from the air, to be converted back to acid and base, may complete its economic life in a shorter time than the expected period, and unnecessary energy consumption may occur.

By means of the present invention, an air purifier is realized, wherein it is detected whether the ambient air is cleaned or not and the source of error is determined in case of an error.

The model embodiments that relate to the air purifier realized in order to attain the aim of the present invention are illustrated in the attached figures, where:

FIG. 1—is the perspective view of the air purifier in an embodiment of the present invention.

Figure 2:
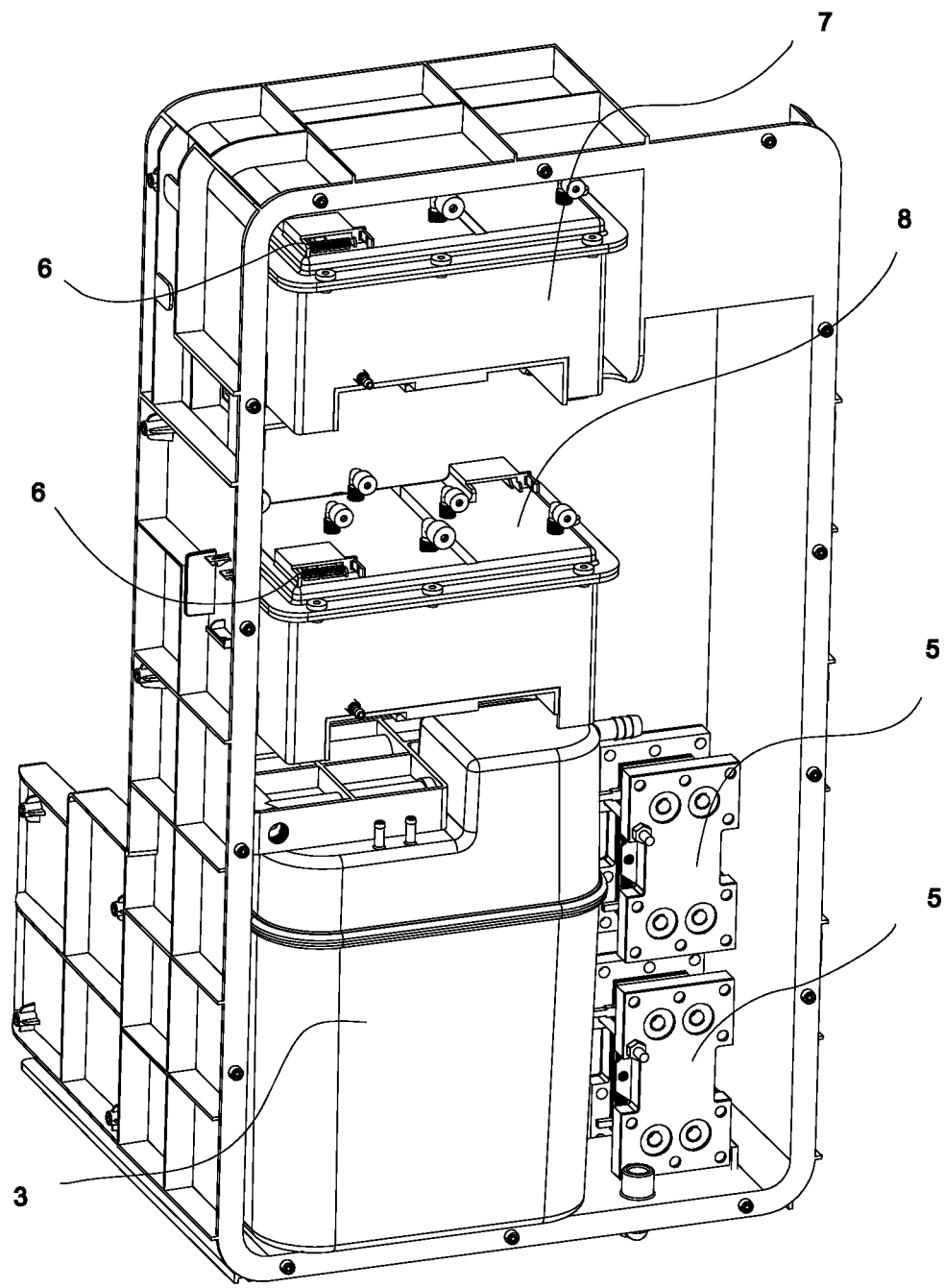

FIG. 2—is the perspective view of a section of the inside of the body of the air purifier where the $CO_2$ adsorption unit, the acid-base tanks and the electrodialysis unit are disposed in an embodiment of the present invention.

Figure 3:
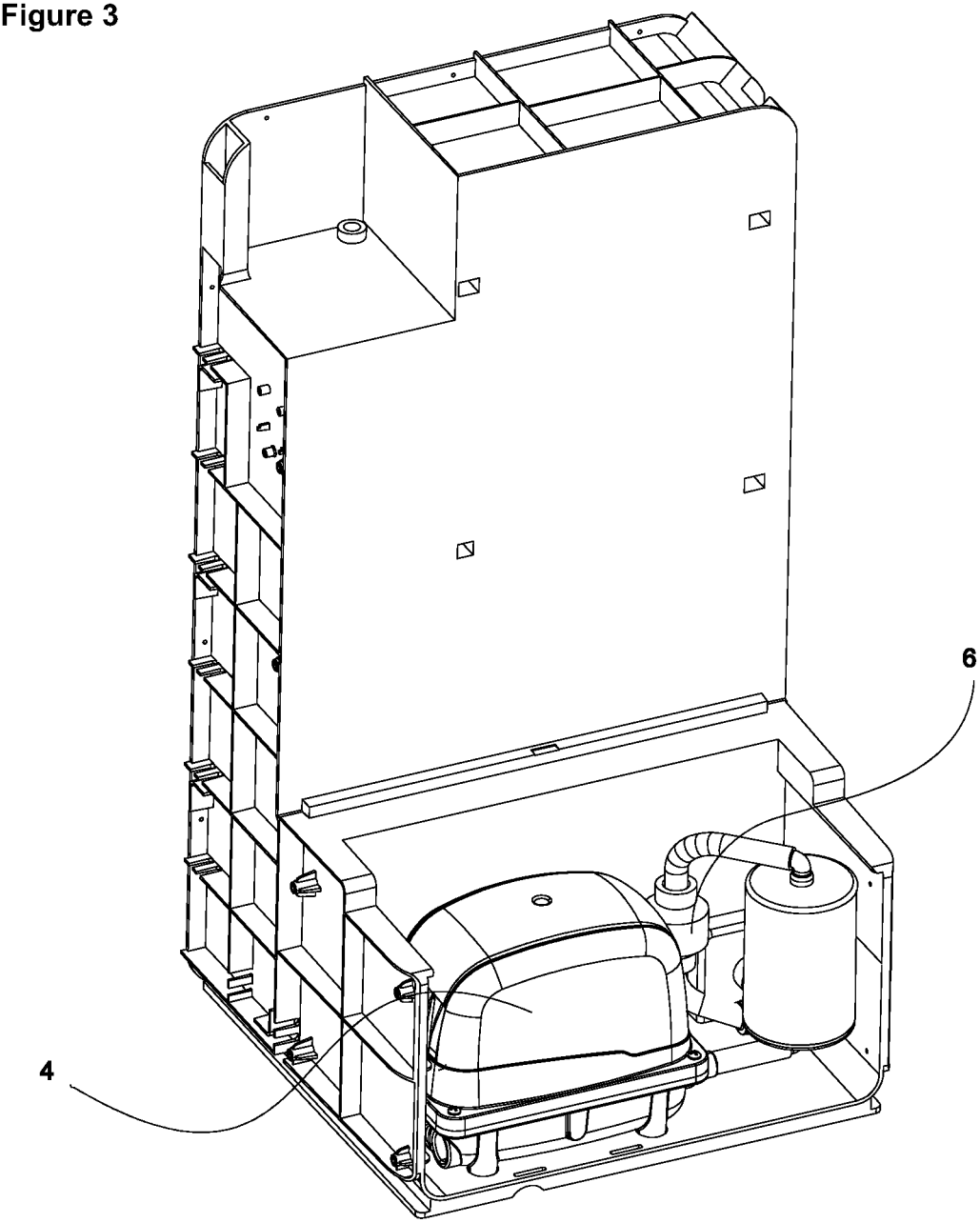

FIG. 3—is the perspective view of a section of the inside of the body of the air purifier where the pump is disposed in an embodiment of the present invention.

Figure 4:
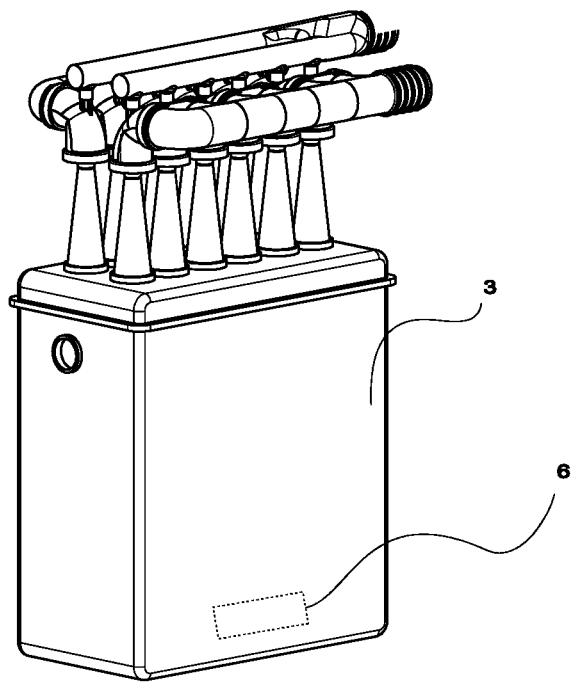

FIG. 4—is the perspective view of the $CO_2$ adsorption unit in the air purifier in an embodiment of the present invention.

Figure 5:
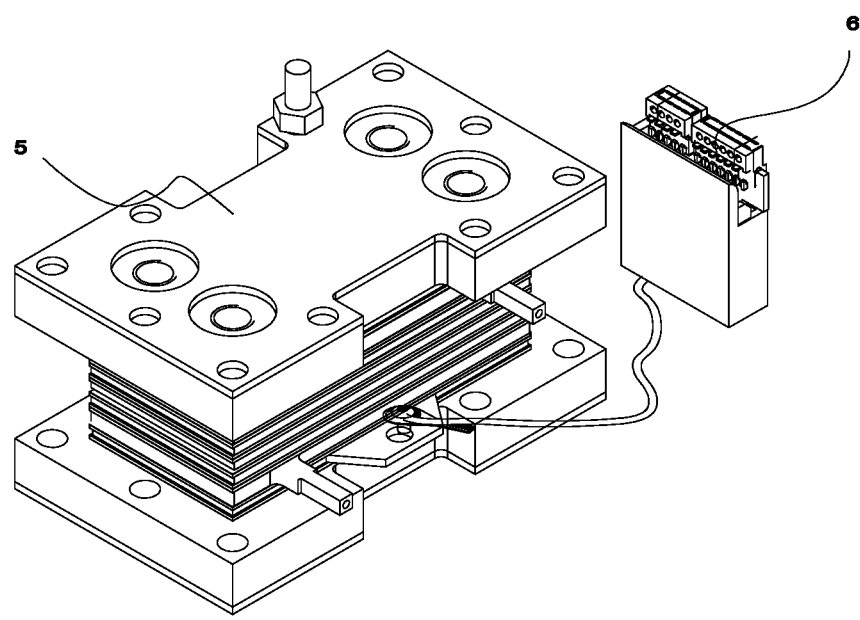

FIG. 5—is the view of the electrodialysis unit and the sensor connected to the electrodialysis unit in the air purifier in an embodiment of the present invention.

Figure 6:
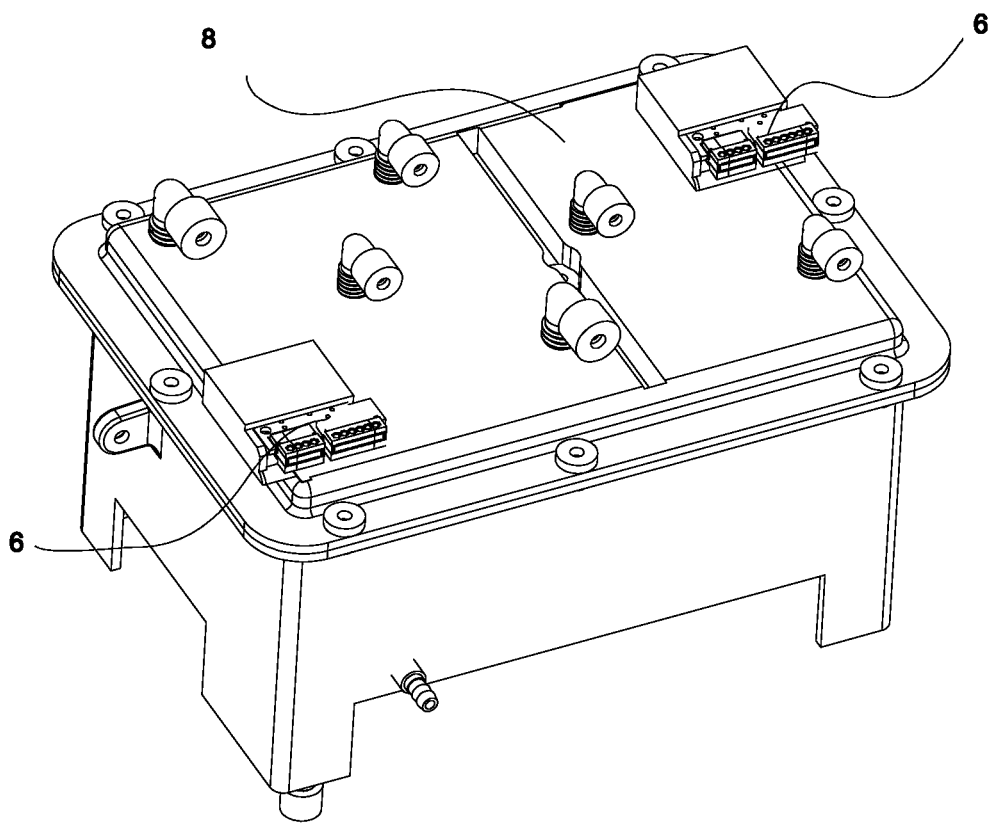

FIG. 6—is the view of the base tank and the sensor disposed into the base tank in the air purifier in an embodiment of the present invention.

The elements illustrated in the figures are numbered as follows:
1. Air purifier
2. Body
3. $CO_2$ adsorption unit
4. Pump
5. Electrodialysis unit
6. Sensor
7. Acid tank
8. Base tank
9. Control unit
10. First $CO_2$ sensor
11. Second $CO_2$ sensor I: Air inlet
O: Clean air outlet The air purifier (1) comprises
- a body (2) having an air inlet (I) through which the air in the environment is sucked and a clean air outlet (O) through which the cleaned air is released to the environment,
- a first $CO_2$ (10) sensor which is disposed at the air inlet (I) and a second $CO_2$ sensor (11) which is disposed at the clean air outlet (O),
- a $CO_2$ adsorption unit (3) which chemically adsorbs the carbon dioxide in the air by supplying a basic solution,
- a pump (4) which delivers the ambient air to the $CO_2$ adsorption unit (3) through the air inlet (I),
- a base tank (8) which supplies the basic solution to the $CO_2$ adsorption unit (3),
- an acid tank (7) wherein the air of which the carbon dioxide is adsorbed is treated with an acidic solution,
- an electrodialysis unit (5) which separates the salt components formed after the ambient air is treated with the basic solution and the acidic solution into acid and base.

The air purifier (1) of the present invention comprises
- at least one sensor (6) which is disposed at least one of the $CO_2$ adsorption unit (3), the pump (4), the acid tank (7), the base tank (8) or the electrodialysis unit (5), and which measures at least one of the parameters such as pH, turbidity, vibration, conductivity, air amount, liquid level and current, and
- a control unit (9) which, if the carbon dioxide amount measured by the first $CO_2$ sensor (10) is equal to the carbon dioxide amount measured by the second $CO_2$ sensor (11), compares the data received from the sensor (6) with the data predetermined by the manufacturer, which is expected under the normal operational conditions, so as to detect errors.

In the air purifier (1) of the present invention, the control unit (9), if the carbon dioxide amounts measured by the first $CO_2$ sensor (10) and the second $CO_2$ sensor (11) are equal to each other, receives data from at least one sensor (6) which is disposed at least one of the $CO_2$ adsorption unit (3), the pump (4), the acid tank (7), the base tank (8) or the electrodialysis unit (5), and which measures at least one of the parameters such as pH, turbidity, vibration, conductivity, air amount, liquid level and current. The control unit (9) compares said data with the data predetermined by the manufacturer, which is expected under the normal operational conditions of the device (1). For example, the pH value of the basic solution taken into the $CO_2$ adsorption unit (3) must be between 8 and 14, and if the data received from the sensor (6) measuring the pH value is outside said value range, the control unit (9) detects that there is a problem in the basic solution in the $CO_2$ adsorption unit (3).

In an embodiment of the present invention, the air purifier (1) comprises a sensor (6) which is disposed in the $CO_2$ adsorption unit (3) and which measures pH and/or turbidity and/or vibration values. The control unit (9) compares the data received from said sensor (6) with the values predetermined by the manufacturer under the normal operational conditions. For example, the refractive index predetermined by the manufacturer under the normal operational conditions is between 1.3 and 1.5. If the data received from the sensor (6) which measures turbidity is outside said range, the control unit (9) detects that there is an error. Thus, the chemical efficiency of the basic solution in the $CO_2$ adsorption unit (3) is determined or it is determined whether the basic solution and the air are properly mixed in the $CO_2$ adsorption unit (3).

In an embodiment of the present invention, the air purifier (1) comprises a sensor (6) which measures the air flow connected to the pump (6). Thus, it is determined whether the sufficient amount of air predetermined by the manufacturer is taken into the body (2) by means of the pump (4) or not.

In an embodiment of the present invention, the air purifier (1) comprises two sensors (6) one disposed in the acid tank (7) and the other in the base tank (8), which measure the liquid levels in the acid tank (7) and the base tank (8) or the pH values of the solutions in the tanks (7, 8). Thus, it is detected whether the tanks (7, 8) contain sufficient amount of acidic and basic solutions predetermined by the manufacturer for the operation of the device (1), and whether the pH values of the solutions in the tanks (7, 8) are suitable for the operation.

In an embodiment of the present invention, the air purifier (1) comprises a sensor (6) which is disposed in the electrodialysis unit (5) or which is connected to the electrodialysis unit (5) and which measures the current value. Thus, the control unit (9) detects whether the salt formed as a result of cleaning the air is separated back to acidic-basic solutions in the electrodialysis unit (5) and supplied back to the acid tank (7) and the base tank (8).

The air purifier (1) of the present invention comprises a control unit (9) which receives data from the sensors (6) in the $CO_2$ adsorption unit (3), the pump (4), the base tank (8), the acid tank (7) and the electrodialysis unit (5) in this order, and compares said data with the operational data, predetermined by the manufacturer, the $CO_2$ adsorption unit (3), the pump (4), the base tank (8), the acid tank (7) and the electrodialysis unit (5) under the normal conditions, so as to detect the source of the error and warn the user. Thus, all the units are checked one by one according to the operation order starting from the $CO_2$ adsorption unit (3) which is the unit where the air and the basic solution are processed first after the operation of the device (1).

By means of the present invention, an air purifier (1) is realized, wherein any erroneous unit can be detected.

The invention claimed is:

1. An air purifier comprising:
    a body having an air inlet through which air in an environment is sucked and a clean air outlet through which cleaned air is released to the environment,
    a first $CO_2$ sensor which is disposed at the air inlet and a second $CO_2$ sensor which is disposed at the clean air outlet,
    a $CO_2$ adsorption unit which chemically adsorbs carbon dioxide in the air by supplying a basic solution,
    a pump which delivers ambient air to the $CO_2$ adsorption unit through the air inlet,
    a base tank which supplies a basic solution to the $CO_2$ adsorption unit,
    an acid tank wherein the air of which the carbon dioxide is adsorbed is treated with an acidic solution,
    an electrodialysis unit which separates salt components formed after the ambient air is treated with the basic solution and the acidic solution into acid and base,
    further comprising:
    at least one sensor which is disposed in at least one of the $CO_2$ adsorption unit, the pump, the acid tank, the base tank or the electrodialysis unit, and which measures at least one parameter such as pH, turbidity, vibration, conductivity, air amount, liquid level and current, and
    a control unit which, if a carbon dioxide amount measured by the first $CO_2$ sensor is equal to the carbon dioxide amount measured by the second $CO_2$ sensor, compares data received from the at least one sensor with data predetermined by a manufacturer, which is expected under normal operational conditions, so as to detect errors.

2. An air purifier as in claim 1, further comprising a sensor which is disposed in the $CO_2$ adsorption unit and which measures pH and/or turbidity and/or vibration values.

3. An air purifier as in claim 1, further comprising a sensor which is connected to the pump and which measures air flow.

4. An air purifier as in claim 1, further comprising a first sensor and a second sensor, the first sensor disposed in the acid tank and the second sensor disposed in the base tank, which measure liquid levels in the acid tank and the base tank or pH values of the solutions in the tanks.

5. An air purifier as in claim 1, further comprising a sensor which is disposed in the electrodialysis unit or which is connected to the electrodialysis unit and which measures a current value.

6. An air purifier as in claim 1, further comprising a control unit which receives data from the at least one sensor disposed in the $CO_2$ adsorption unit, the pump, the base tank, the acid tank, and the electrodialysis unit in this order, and compares said data with operational data predetermined by the manufacturer corresponding to the $CO_2$ adsorption unit, the pump, the base tank, the acid tank and the electrodialysis unit under normal conditions, so as to detect a source of an error and warn a user.

7. An air purifier as in claim 2, further comprising a sensor which is connected to the pump and which measures air flow.

8. An air purifier as in claim 2, further comprising a first sensor and a second sensor, the first sensor disposed in the acid tank and the second sensor disposed in the base tank, which measure liquid levels in the acid tank and the base tank or pH values of the solutions in the tanks.

9. An air purifier as in claim 3, further comprising a first sensor and a second sensor, the first sensor disposed in the acid tank and the second sensor disposed in the base tank, which measure liquid levels in the acid tank and the base tank or pH values of the solutions in the tanks.

10. An air purifier as in claim 2, further comprising a sensor which is disposed in the electrodialysis unit or which is connected to the electrodialysis unit and which measures a current value.

11. An air purifier as in claim 3, further comprising a sensor which is disposed in the electrodialysis unit or which is connected to the electrodialysis unit and which measures a current value.

12. An air purifier as in claim 4, further comprising a sensor which is disposed in the electrodialysis unit or which is connected to the electrodialysis unit and which measures a current value.

13. An air purifier as in claim 2, further comprising a control unit which receives data from the at least one sensor disposed in the $CO_2$ adsorption unit, the pump, the base tank, the acid tank, and the electrodialysis unit in this order, and compares said data with operational data predetermined by the manufacturer corresponding to the $CO_2$ adsorption unit, the pump, the base tank, the acid tank and the electrodialysis unit under normal conditions, so as to detect a source of an error and warn a user.

14. An air purifier as in claim 3, further comprising a control unit which receives data from the at least one sensor disposed in the $CO_2$ adsorption unit, the pump, the base tank, the acid tank, and the electrodialysis unit in this order, and compares said data with operational data predetermined by the manufacturer corresponding to the $CO_2$ adsorption unit, the pump, the base tank, the acid tank and the electrodialysis unit under normal conditions, so as to detect a source of an error and warn a user.

15. An air purifier as in claim 4, further comprising a control unit which receives data from the at least one sensor disposed in the $CO_2$ adsorption unit, the pump, the base tank, the acid tank, and the electrodialysis unit in this order, and compares said data with operational data predetermined by the manufacturer corresponding to the $CO_2$ adsorption unit, the pump, the base tank, the acid tank and the electrodialysis unit under normal conditions, so as to detect a source of an error and warn a user.

16. An air purifier as in claim 5, further comprising a control unit which receives data from the at least one sensor disposed in the $CO_2$ adsorption unit, the pump, the base tank, the acid tank, and the electrodialysis unit in this order, and compares said data with operational data predetermined by the manufacturer corresponding to the $CO_2$ adsorption unit, the pump, the base tank, the acid tank and the electrodialysis unit under normal conditions, so as to detect a source of an error and warn a user.

* * * * *